United States Patent [19]

Davis et al.

[11] 4,435,823
[45] Mar. 6, 1984

[54] ADAPTIVE EQUALIZER CAPABLE OF LINEAR AND NONLINEAR WEIGHTING

[75] Inventors: Robert C. Davis, Indialantic; Gautam H. Thaker, Melbourne, both of Fla.

[73] Assignee: Harris Corporation, Melbourne, Fla.

[21] Appl. No.: 221,020

[22] Filed: Dec. 29, 1980

[51] Int. Cl.[3] ............................................. H04B 3/18
[52] U.S. Cl. ...................................... 375/14; 364/724
[58] Field of Search ...................... 375/11, 12, 13, 14, 375/15, 16; 364/724; 333/18

[56] References Cited

U.S. PATENT DOCUMENTS

| | | | |
|---|---|---|---|
| 4,034,196 | 7/1977 | Butterweck et al. | 375/14 |
| 4,038,536 | 7/1977 | Feintuch | 333/18 |
| 4,053,734 | 10/1977 | Berlin et al. | 374/723 |
| 4,066,881 | 1/1978 | Houdard | 364/724 |
| 4,125,900 | 11/1978 | Betts | 364/724 |
| 4,146,931 | 3/1979 | Delforge | 364/724 |
| 4,163,209 | 7/1979 | McRae | 340/146.1 |
| 4,233,683 | 11/1980 | McRae | 375/14 |
| 4,261,051 | 4/1981 | Ohnishi | 364/724 |
| 4,285,061 | 8/1981 | Ho | 375/15 |
| 4,343,759 | 8/1982 | Kustka et al. | 375/14 |

*Primary Examiner*—Benedict V. Safourek

*Attorney, Agent, or Firm*—Antonelli, Terry & Wands

[57] ABSTRACT

Equalizers are commonly used in digital data signaling systems to reduce the effects of intersymbol interference on a signal received over a transmission channel. However, conventional equalizers are relatively slow due to their use of multipliers. Also, generally such equalizers are limited to providing a linear response to the received input signal samples. Accordingly, to provide a high-speed equalizer which is capable of both linear and nonlinear response, a transmission channel signal containing intersymbol interference is passed through a delay means which provides sequential Q-bit samples of said transmission channel signal. These Q-bit samples are then applied to a weighting means which includes a memory having stored equalizing weighting values which are accessed in accordance with the Q-bit samples to provide predetermined weighted output words in response to the Q-bit samples. These output words can be either linear or nonlinear with respect to the Q-bit samples. This technique serves to reduce intersymbol interference in the received signal thereby equalizing this signal. Also, since no multipliers are necessary, the equalizing operation can be carried out at a very high speed.

23 Claims, 5 Drawing Figures

EYE PATTERN FOR BINARY SIGNALING,
CHANNEL: $f_0 = 1, f_1 = 0.25$.

ADAPTIVE EQUALIZER CAPABLE OF LINEAR AND NONLINEAR WEIGHTING

FIELD OF THE INVENTION

This invention relates generally to methods of and apparatus for equalizing received digital signals. More particularly, the present invention relates to methods of and apparatus for both linear and nonlinear equalizing suitable for use with high-speed digital signaling systems.

BACKGROUND OF THE INVENTION

Over the past decade, the utilization of digital data signaling systems has expanded at a tremendous rate due to the increased use of digital equipment for producing such digital data. Such digital signaling systems have thus been developed to handle signals having data rates anywhere from very low speed systems, such as teletypewriters which generally do not exceed 100 bits per second, to very high speed systems such as PCM color TV systems which can operate at 100 megabits per second or higher.

Although a great deal of work has thus been done in developing such digital data signaling systems, a persistent problem has been how to best deal with the effects of intersymbol interference (ISI). This problem arises on channels in which the pulses representing different transmitted symbols overlap in time to some degree. The overlap of the pulses causes a greater difficulty in the reliable estimation of the transmitted symbol at the receiver. For example, the output of a channel which creates intersymbol interference is formally represented as:

$$y_i = f_o x_i + \sum_{k \neq 0} f_k x_{i-k} \quad (1)$$

where
 $x_i$ = Channel input pulse at time i
 $f_o$ = Largest sample of the channel input response
 $f_k$ = Channel coefficient which is the fraction of the $(i-k)^{th}$ input pulse that contributes to the channel output at the $i^{th}$ symbol time, i.e., intersymbol interference
 $y_i$ = Channel output at the $i^{th}$ symbol time From Equation 1, one observes that the channel output is, in general, influenced by other input symbols which surround the present input pulse, $x_i$. If the channel had no intersymbol interference, $f_o = 1$ and $f_k = 0$, $k \neq 0$. In this case, the channel output, $y_i$, is proportional to the input, $x_i$, with no intersymbol interference from surrounding input symbols.

The intersymbol interference phenomenon is often graphically displayed by a plot of the "eye pattern." This eye pattern is simply a plot of all possible values for $y_i$ obtained by assuming all possible sequences of input symbols $x_i$. For example, assuming binary input symbols $x_i = \pm 1$ and $x_{i-1} = \pm 1$ and a channel characterized by $f_o = 1$ and $f_1 = 0.25$, with all other $f_k = 0$, one obtains from Equation 1 the outputs $y_i = 1.25, 0.75, -0.75$ and $-1.25$ for all four combinations of $\{x_i, x_{i-1}\}$. These values are plotted in FIG. 1. In the absence of intersymbol interference (ISI), the values for channel output of $\pm 1$ as shown by the dashed lines in FIG. 1 would be observed. With ISI, it can be seen that the ideal outputs are modified to either $\pm 1.25$ or $\pm 0.75$ depending upon the data pair, $\{x_i, x_{i-1}\}$. The minimum spacing, called the "eye opening," between data levels has been reduced from 2.0 for no ISI, to 1.5 with ISI. With added noise, the probability of error is increased due to the ISI since less margin exists to a slicing threshold at zero.

Conceptually, equalizers recover some of the performance loss brought about by ISI by attempting to open the eye pattern at the receiver. Usually a penalty is incurred in opening the eye pattern through noise enhancement. That is, when the eye pattern is opened by the equalizer, more noise exists on the equalizer output sample than on the channel output sample. For one type of theoretically perfect equalizer, this noise enhancement phenomenon can be displayed in the following way. Using the delay operation, D, sequences of channel outputs $y_i$ can be represented formally as coefficients in the polynomial $$y(D) = y_o + y_1 D + y_2 D^2 \ldots \quad (2)$$

and channel inputs by $$x(D) = x_o + x_1 D + x_2 D^2 \ldots \quad (3)$$

With this characterization, and Equation (1), we can write $$y(D) = x(D) f(D) \quad (4)$$

where $$f(D) = \Sigma f_k D^k \quad (5)$$

Thus, from Equation (4), the action of the channel is seen to be a polynomial multiplication of the input polynomial, x(D), by the channel polynomial, f(D). Obviously, the effect of the channel can be completely undone by dividing the reveived sequence, y(D), by the polynomial, f(D). This division can be accomplished by feeding the received sequence into a recursive filter. Equivalently, the equalization can be performed by feeding the received sequence into an infinite length transversal filter characterized by tap gain polynomial $$t(D) = 1/f(D) \quad (6)$$

Considering the specific f(D) polynomial producing the eye pattern of FIG. 1, i.e. $f(D) = 1 + 0.25D$, the equalizer is defined by $$t(D) = \frac{1}{1 + .25D} = \sum_{i=0}^{\infty} (-.25D)^i \quad (7)$$

$$t(D) = 1 - .25D + (.25)^2 D^2 - (.25)^3 D^3 + \ldots$$

Equation (7) characterizes the infinite transversal filter which is required to perfectly equalize the channel. The coefficients of t(D) specify the tap gains for the equalizer. Of course, as a practical matter the transversal equalizer would have to be truncated at some finite length, say n, where $(0.25)^n$ is insignificant.

Turning now to the question of noise enhancement, if the infinite length transversal filter defined in Equation (7) is used to perfectly undo the ISI created by the channel, the noise enhancement factor is given by the sum of the squares of the coefficients of the t(D) polynomial, i.e.:

$$N_e = \sum_{i=1}^{\infty} (-.25^2)^i \qquad (8)$$

$$= \sum_{i=1}^{\infty} (1/16)^i$$

$$= 1/(1\ 1/16)$$

$$N_e = 16/15 = 1.067$$

The quantity, $N_e$, gives the factor by which the variance of the equalizer input sample noise is increased at the output of the equalizer. Thus, one pays a penalty for the privilege of equalizing the channel and this penalty is usually in the form of noise enhancement. The improved performance may, however, make the penalty very worthwhile. In the above example, the noise is only increased by a factor of 1.067, so the greatly improved eye pattern opening makes such a penalty very worthwhile.

The foregoing background has been given to show fundamentally how linear equalizers accomplish their function (opening the eye pattern) and the penalty (noise enhancement) incurred in the performance of this function. Although the equalizer examined above was the infinite length transversal filter required to provide zero intersymbol interference, other types of equalizers of finite length exist and algorithms are available for automatically adjusting the tap gains to accomplish equalization. FIG. 2 shows an example of such a finite length linear equalizer structure.

Referring to FIG. 2, the channel output signal, which includes ISI, is fed to an N-stage delay line 10 through a baud rate sampler 12. The outputs of the N-stage delay line 10 are each coupled to a multiplier 14. Each of these multipliers 14 is fed with a weighting function $w_i$ where $i = 1 \ldots N$. The weighted outputs from these multipliers 14 are then combined to form a composite equalized output by an adder 16.

With regard to the linear equalizer of FIG. 2, $$t(D) = \sum_{i=1}^{N} w_i D^{i-1} \qquad (9)$$

defines the equalizer transfer function. The linear tap weights, $\{w_i\}$, are determined adaptively by one of several known techniques using well-known circuitry not shown in FIG. 2.

As shown in FIG. 2, the output from a linear equalizer is given by a linear weighted combination of tap outputs. Typically, a known training sequence is initially transmitted over the channel and the tap gain adjustment circuitry (not shown) learns appropriate tap gains to use in order to effect equalization of the ISI existing on the channel.

Although the basic linear equalizer shown in FIG. 2 can significantly reduce ISI without substantial degradation of the noise enhancement factor, it suffers from a number of problems. In particular, the requirement of using multipliers for the equalization is relatively time consuming. This can result in limiting the response speed of the receiver. Such limitations can be especially troublesome in situations where high bit rates must be handled.

Another shortcoming of the basic linear equalizer of FIG. 2 is the fact that it does not perform nonlinear equalization. In some cases, the ability to perform nonlinear tap gain weighting may be a more effective equalization technique than linear weighting. Such nonlinear weighting would be useful, for example, in combating nonlinearities occurring in the channel. Even in the absence of such nonlinearities in the channel, nonlinear equalizer can have merit. For example, a nonlinear output versus input characteristic can display a soft limiter function which essentially makes a decision on the selected tap position bit and weights this decision. Such a limiter characteristic can have the beneficial effect of suppressing noise on the equalizer output.

A discussion of the desirability of nonlinear equalizers with regard to linear equalizers in terms of the eye pattern and error probability is set forth in an article by Gottfried Ungerboeck published in the December 1971 issue of the IEEE Transactions on Communication Technology, entitled "Nonlinear Equalization of Binary Signals in Gaussian Noise." In this paper, a very complex nonlinear equalizer is first described. However, since this equalizer is not feasible for actual implementation in a practical system, sub-optimal approximations for nonlinear equalizers are subsequently discussed. To accomplish this, a plurality of nonlinear decision elements can be used which take the form of soft limiters rather than linear tap gains. Although Ungerboeck then proceeds to show that even these sub-optimal nonlinear equalizers are superior to an optimal linear equalizer, the system which he proposes is still relatively slow in operation. Also, although Ungerboeck mentions the possibility of making the system adaptive, no example is given for this, and Ungerboeck specifically indicates that further experimentation would be necessary in this ragard.

SUMMARY OF THE INVENTION

It is, therefore, an object of the present invention to provide new and improved methods of an apparatus for equalizing.

Another object of the present invention is to provide new and improved methods of and apparatus for both linear and nonlinear equalizing.

A further object of the present invention is to provide an improved equalizer capable of operating at high speeds while providing both linear and nonlinear equalization.

To achieve these and other objects, the present invention contemplates new methods and apparatus for equalizing by passing a transmission channel signal containing intersymbol interference through a delay means which provides sequential Q-bit samples of said transmission channel signal. These Q-bit samples are then applied to a weighting means which includes a memory having stored equalizing weighting values which are accessed in accordance with the Q-bit samples to provide predetermined weighted output words in response to the Q-bit samples. This technique thus serves to reduce intersymbol interference in the received signal thereby equalizing this signal.

BRIEF DESCRIPTION OF THE DRAWINGS

Other objects and advantages of the present invention may be more clearly understood by references to the following detailed description and drawings wherein.

DETAILED DESCRIPTION OF THE PREFERRED EMBODIMENTS

Figure 3:
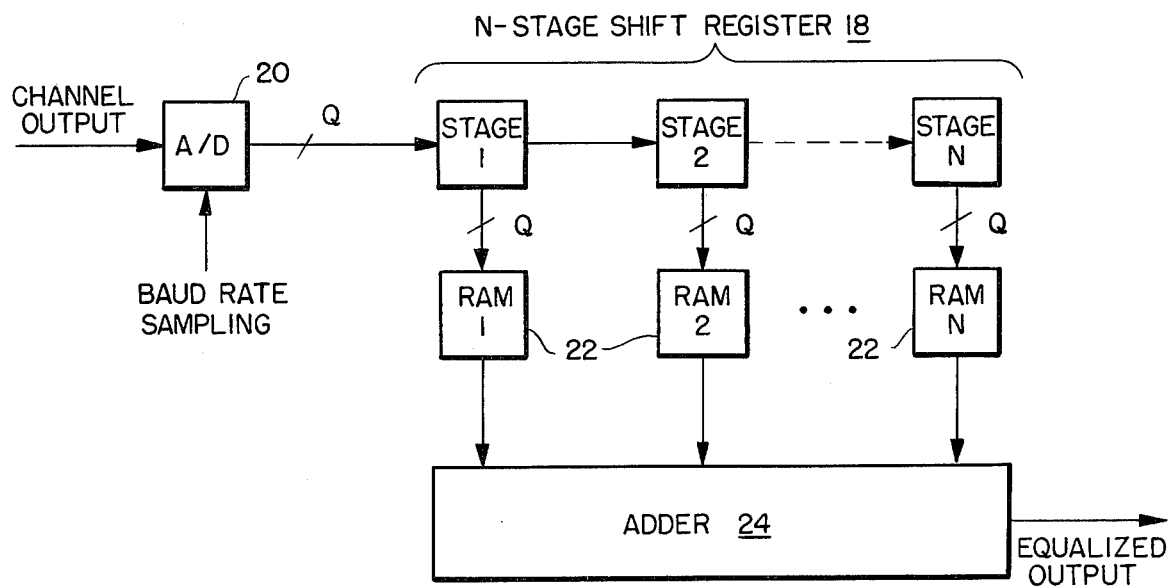
FIG. 3 shows a basic embodiment of a nonlinear filter in accordance with the present invention.

Turning now to FIG. 3, a basic equalizer in accordance with the present invention is shown. This equalizer is capable of both linear and nonlinear equalization.

Specifically, in FIG. 3, the channel output is fed to an N-stage shift register 18 through a sampler 20 (comprised of, for example, an A/D converter fed with a baud rate sampling signal). The outputs of the individual shift register stages are coupled to a plurality of RAM's 22 which are specifically loaded to provide the desired weighting function for equalization. The weighted outputs of these RAM's 22 are coupled to an adder 24 for combining these weighted outputs into a composite equalized signal.

In operation, the channel output shown in FIG. 3 is sampled in the sampler 20 to provide Q-bit quantized sample words to the N-stage shift register 18. Each stage of the register 18 stores one Q-bit sample. Each stage presents its Q-bit sample as an address to a $2^Q$-word storage random access memory (RAM 22). An M-bit word is accessed from each of the N RAM's and these N words are added together in the adder 24 to form the equalizer output.

Figure 1:
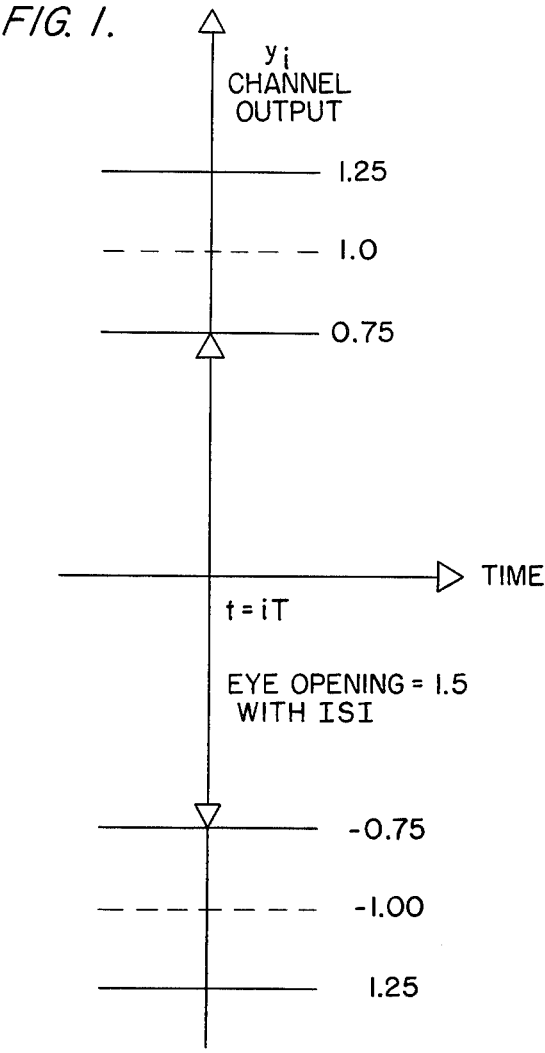
FIG. 1 shows a plot of the "eye pattern" for the purpose of explaining the effects of intersymbol interference in digital signaling.
Figure 2:
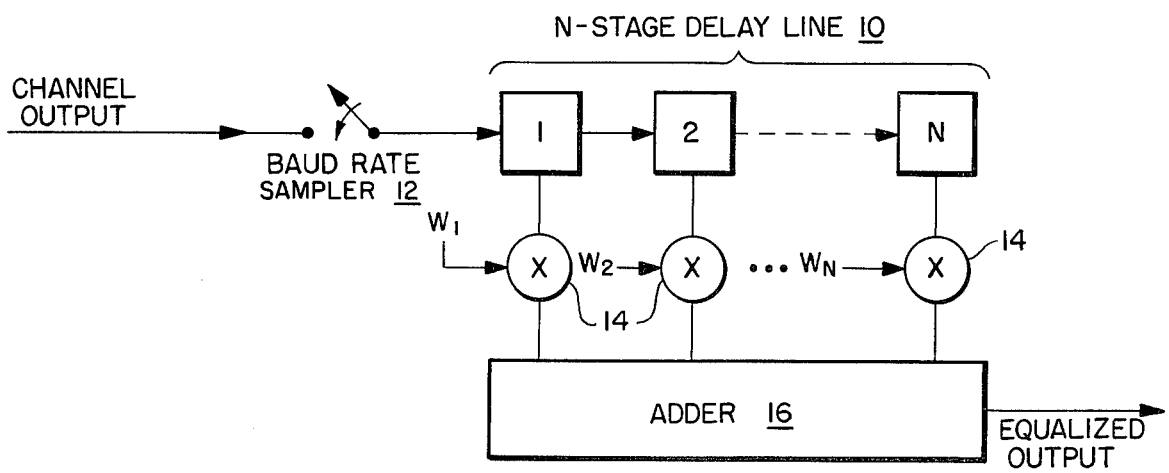
FIG. 2 shows a conventional linear transversal filter.

As shown in FIG. 3, the linear tap gain weight multipliers 14 of FIG. 2 have been replaced with Random Access Memories (RAM's 22). Conceptually, in relation to FIG. 2, the RAM's in FIG. 3 could be loaded with words in each address location to output a word given by the product of the tap gain, $w_i$, in FIG. 2 and the tap word. Therefore, if the RAM's were loaded appropriately in FIG. 3, exactly the same equalization as in FIG. 2 could be performed. That is, standard linear equalization could be performed by the structure shown in FIG. 3. However, the structure has the power to perform other than linear weighting on the tap positions since the words stored in the RAM's can be set to values corresponding to nonlinear outut versus input characteristics. Specific nonlinear words can be loaded into the RAM's to provide the desired nonlinear operation as discussed above.

With the structure shown in FIG. 3, we note that unlike the linear equalizer structure of FIG. 2, no multiplication of weight times tap sample is required to form a tap's contribution to the equalizer output. A RAM word is simply accessed and provided to the output adder. As discussed above, digital multipliers can require a relatively long time after presentation of inputs before the output product is formed, so the avoidance of this multiplication is desirable in high rate systems.

Thus, it can be seen that the construction of FIG. 3 results in several advantages over the prior art system of FIG. 2. However, in practical implementation, it is often desirable to have equalizers which are adaptive. Accordingly, FIG. 4 sets forth an example of an adaptive equalizer which is capable of both linear and nonlinear operation.

Figure 4:
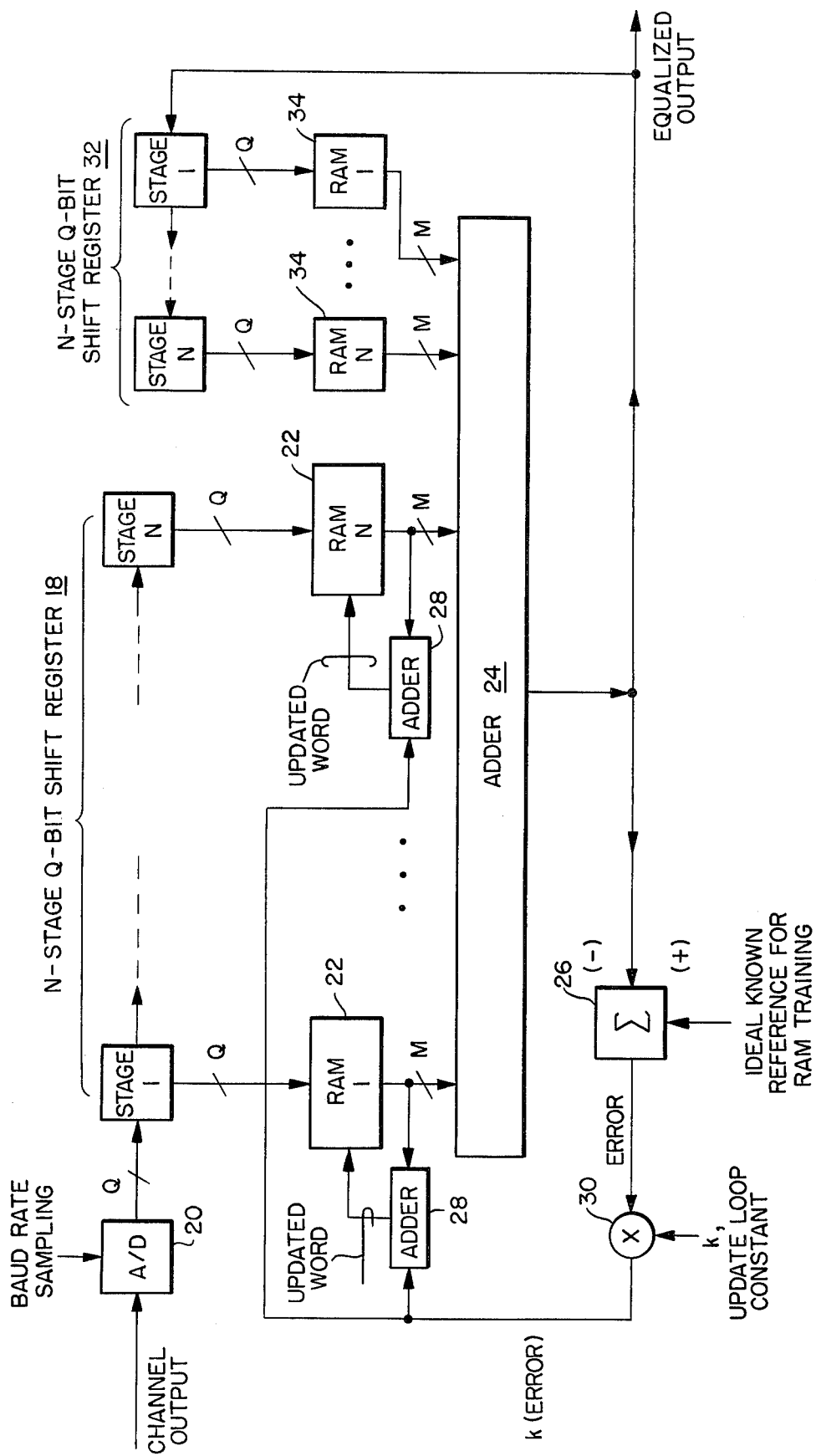
FIG. 4 shows an adaptive recursive nonlinear filter in accordance with the present invention.

Referring to FIG. 4, wherein like numerals indicate like elements of FIG. 3, it can be seen that the same basic arrangement of a sampler 20, an N-stage Q-bit shift register 18, RAM's 22, and an adder 24 as shown in FIG. 3 is provided. However, FIG. 4 also includes means for making the system adaptive through the use of a comparator 26 which receives the composite equalized output signal from the adder 24 and an ideal known reference signal for RAM training. The output of the comparator 26 is coupled to a plurality of adders 28 (one for each RAM) through a multiplier 30. The adders 28 also receive the output word from the RAM's to which they are connected. The outputs of these adders 28 are then fed to the RAM's 22 for updating the loaded weighting words therein.

The operation of FIG. 4 as an adaptive equalizer will now be discussed. For training purposes, it is assumed that the transmitted symbol for the present baud time is known. The equalizer output from the adder 24 is subtracted in the comparator 26 from this ideal reference to form an error signal as shown. A fraction, k, of this error signal is obtained by passing the error signal through the multiplier 30. This fractional error signal is added to each of the N RAM words used to produce the present equalizer output. The updated RAM words are then read back into each of the RAM's 22. Thus, an update or training cycle is completed for the present baud time. A new Q-bit sample is next shifted from the A/D sampler 20 into the N-stage shift register 18 with all the stage contents shifting to the right. The update cycle then repeats.

In the steady state the RAM contents will have stabilized to such values that the average error produced will be zero when each of the $2^Q$ addresses is accessed. That is not to say that the error will always be zero—only the average error will be zero. As with all equalizer structures, some residual error will remain at any specific baud time.

The constant, k, in the above structure is chosen, as is usual with adaptive update loops, as a compromise between tracking capability and residual noise jitter weighting values. In other words, although a large constant k will allow faster acquistion, it also will produce a greater degree of jitter in the Ram-stored words. Therefore, a value for k is set based on the particular system requirements to allow adequate acquisition times without unduly jittering the RAM-stored words.

The adaptive structure discussed above has been found to be stable and to be capable of acquiring reliably even when starting with all of the RAM's initially loaded with zeros. In the course of these discussions a known reference has been assumed. Operationally, the use of such an equalizer would, therefore, require the transmission of a known training sequence at the transmitter (most likely a PN sequence would be used as the source of the known sequence). This sequence (being known to the receiver) would then be used to train the RAM loadings in an initialization phase before transmission of data. After such training, the RAM loadings tend to values corresponding to a soft limiter nonlinearity between the tap input and RAM output.

In addition to being adaptive, the system of FIG. 4 is also capable of recursive operation. Specifically, as shown in FIG. 4, the adaptive equalizer output from the adder 24 can be fed to a second N-stage shift register 32. This second N-stage shift register 32 provided a sequential series of Q-bit samples of the equalized output. These Q-bit samples are then fed to a second set of RAM's 34. As is the case for the RAM's 22, this second set of RAM's 34 also stores equalizing weighting words for producing predetermined weighted output words in response to the Q-bit samples from the shift register 32. These weighted output words are then fed into the adder 24, along with the output words from the first set of RAM's 22. In this way, the circuit of FIG. 4 can be made recursive, and, thereby appear as having much greater overall length. Of course, although it is not shown in FIG. 2, the second set of RAM's 34 could also be made adaptive by providing an adaptive feedback loop similar to that used for the RAM's 22.

Figure 5:
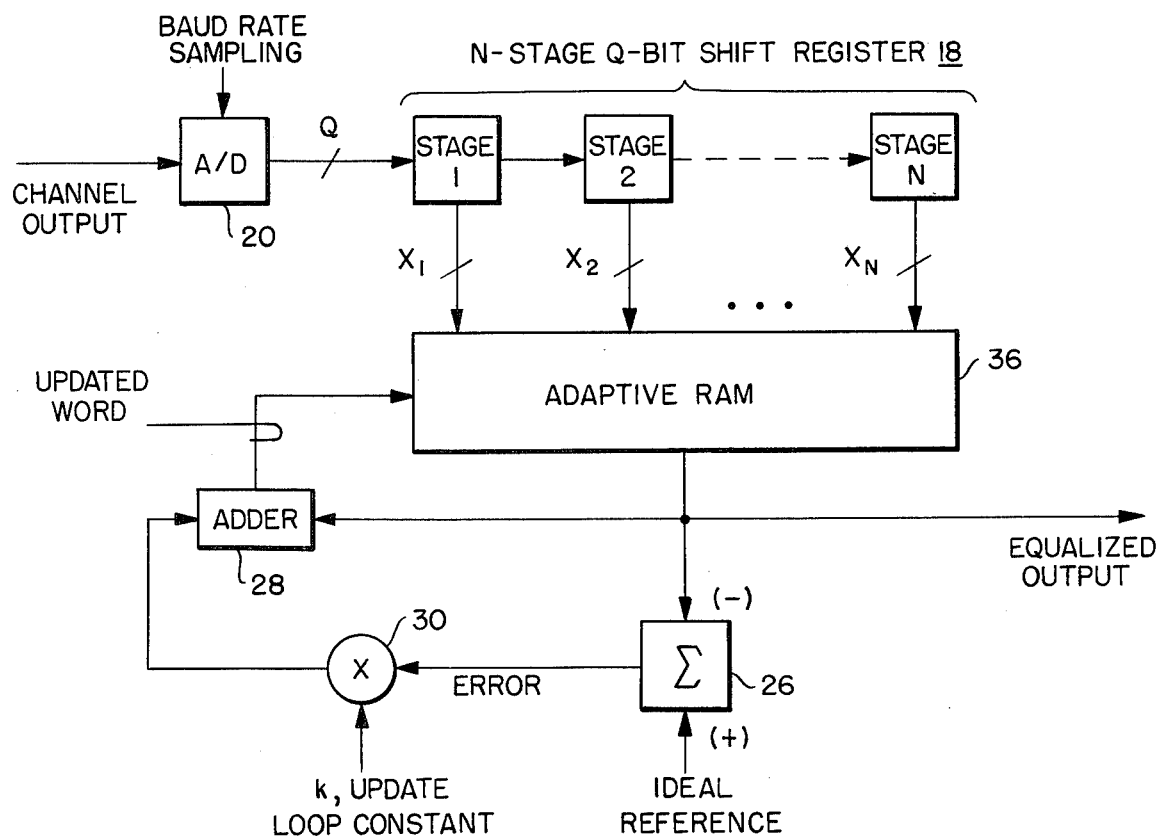
FIG. 5 shows an alternative embodiment of an adaptive nonlinear filter in accordance with the present invention.

FIG. 5 shows an alternative embodiment for an adaptive equalizer structure in accordance with the present invention. Like numerals in FIG. 5 indicate like elements to FIG. 4. Here, only a single adaptive RAM 36 is used and all N-stages of the shift register 18 provide input address information to this RAM. The equalized output is simply accessed from the single RAM 36. The RAM loadings are learned in a training mode just as in the previous equalizer structure discussed with regard to FIG. 4. It can be shown that the RAM loading in the address location specified by the N samples, $x_1, x_2, \ldots, x_N$ is the expected value of the reference given $x_1, x_2, \ldots, x_N$. This is the minimum mean square error estimate of the reference given the observables, $x_1, x_2, \ldots x_N$.

Although the present invention has been described in terms of RAM memories, it should be understood that in certain instances where it is not necessary for the equalizer to be adaptive, ROM's could be used if desired.

Also, although the present invention is described in terms of a single equalizer stage, it is to be understood that the equalizer structure shown in FIGS. 3 through 5 could be concatenated. That is, the equalizer output from the first equalizer can serve as the input to a second equalizer to further improve the quality of the equalization.

It is to be understood that the above-described arrangements are simply illustrative of the application of the principles of this invention. Numerous other arrangements may be readily devised by those skilled in the art which embody the principles of the invention and fall within its spirit and scope.

We claim:

1. An equalizer for reducing intersymbol interference in a signal received over a transmission channel comprising:
   delay means for receiving said transmission channel signal and providing sequential Q-bit samples of said received transmission channel signal;
   weighting means comprising a memory coupled to receive the Q-bit samples from said delay means, said memory having stored therein adaptive equalizing weighting values which are accessed in accordance with the Q-bit samples to provide weighted memory output words in response to the received Q-bit sample; and
   combining means for combining said weighted memory output words accessed from said memory, so as to equalize the received transmission channel signal.

2. An equalizer as in claim 1, wherein said memory produces output words which are linearly weighted with respect to the received Q-bit samples.

3. An equalizer as in claim 1, wherein the memory produces output words which are nonlinearly weighted with respect to the received Q-bit samples.

4. An equalizer as in claim 1, wherein the delay means comprises an N-stage shift register and wherein the memory comprises a first set of RAM's, wherein individual RAM's are each coupled to individual shift register stages.

5. An equalizer as in claim 4, wherein said combining means comprises an adder coupled to each RAM output for adding together the respective weighted output word of each RAM to form a composite equalized output signal.

6. An equalizer as in claim 1, wherein the delay means is an N-stage shift register and wherein the memory and combining means comprises a single adaptive RAM which produces an equalized output signal corresponding to the respective Q-bit output samples of the shift register stages.

7. An equalizer as in claim 1, further comprising feedback means for updating the equalizing weighting values stored in the memory in accordance with the weighted output words of said memory.

8. An equalizer as in claim 7, further comprising comparator means for comparing the equalized output signals with an ideal reference signal to produce an error signal for updating the equalizing weighting values stored in the memory.

9. An equalizer as in claim 8, further comprising means for multiplying said error signal by an update constant k prior to updating of said memory.

10. An equalizer as in claim 5, further including a recursive loop comprising a second N-stage tapped shift register coupled to receive the composite weighted output signal from said adder, wherein each stage of said second shift register stores a Q-bit sample of said composite weighted output signal, and a second set of RAM's coupled to receive the Q-bit output samples from each stage of said second shift register, said second set of RAM's providing predetermined weighted output words in response to the received second shift register Q-bit output samples, and means for coupling the weighted output words from the second set of RAM's to the adder so that the composite weighted output signal from the adder is a function of the weighted outputs of both the first and second sets of RAM's.

11. A method for equalizing a signal received over a transmission channel to reduce intersymbol interference in said received signal, comprising the steps of:
   passing said received transmission channel signal through delay means to provide sequential Q-bit samples of said received transmission channel signals;
   coupling the Q-bit samples to a weighting means comprising a memory having stored adaptive equalizing weighting values and accessing therefrom adaptive equalizing weighting values stored in said memory in accordance with said Q-bit samples, thereby providing weighted output words in response to the received Q-bit samples; and
   combining said weighted memory output words access from memory, so as to equalize the received transmission channel signal.

12. A method as in claim 11, wherein the memory produces output words which are linearly weighted with respect to the Q-bit samples.

13. A method as in claim 11, wherein the memory produces output words which are nonlinearly weighted with respect to the Q-bit samples.

14. A method as in claim 11, wherein the delay means comprises an N-stage shift register and the memory comprises a first set of RAM's, with individual ones of said RAM's being coupled to respective stages of said shift register, and wherein said step of combining includes adding the respective weighted output words of said RAM's together to form a composite equalized output signal.

15. A method as in claim 11, wherein the delay means comprises an N-stage shift register and the memory comprises a single adaptive RAM for producing an equalized output signal in accordance with the input Q-bit samples received from the respective stages of said shift register.

16. A method as in claim 11, further comprising the step of feeding back a portion of the equalized output signals of said memory to update the equalizing weighting values stored in said RAM.

17. A method as in claim 16, further comprising comparing the equalized output signals with an ideal reference signal to produce an error signal for updating the equalizing weighting values stored in said memory.

18. A method as in claim 17, further comprising multiplying said error signal by an update constant k to produce an updating signal for said memory.

19. A method as in claim 14, further comprising passing the composite weighted output signal from said adder through a second shift register wherein each stage of said second shift register stores a Q-bit sample of the composite weighted output signal, and coupling the Q-bit samples from said second shift register to a second set of RAM's for accessing predetermined weighted output words in response to the Q-bit output samples from said second shift register, and feeding the weighted output words from said second set of RAM's to the adder so that the composite weighted output signal from said adder is a function of the weighted output signals of both the first and second sets of RAM's.

20. A high-speed adaptive equalizer for reducing intersymbol interference in a signal received over a transmission channel comprising:
an N-stage tapped shift register for receiving said transmission signal and providing sequential Q-bit samples of said received transmission signal;
weighting means comprising at least one RAM coupled to receive the Q-bit samples from said shift register, said RAM having stored equalizing weighting values which are accessed in accordance with Q-bit samples to provide a composite equalization signal in response to the received Q-bit samples to thereby equalize the received transmission channel signal;
comparator means for comparing said composite equalization signal from said weighting means with an ideal known reference signal to produce an error signal;
means for adding the error signal to the equalizing weighting values stored in RAM to produce updated equalizing weighting values; and
means for entering the updated equalizing weighting values into the RAM.

21. An equalizer as in claim 20, further comprising means coupled between the comparator and the adding means for multiplying the error signal by an update loop constant k.

22. A method for providing high-speed adaptive equalization for reducing intersymbol interference in a signal received over a transmission channel comprising:
passing said received transmission channel signal through an N-stage tapped shift register to provide sequential Q-bit samples of said received transmission channel signal;
coupling the Q-bit samples to a weighting means comprising at least one RAM having stored therein equalizing weighting values and accessing equalizing weighting values stored in said at least one RAM in accordance with said Q-bit samples, thereby providing a composite equalization signal in response to the received Q-bit samples so as to equalize the received transmission channel signal;
comparing said composite equalization signal with an ideal known reference signal to produce an error signal;
adding the error signal to equalizing weighting values stored in RAM to produce updated equalizing weighting values; and
entering the updated equalizing weighting values in the RAM.

23. A method as in claim 22, further comprising the step of multiplying the error signal by an update loop constant k prior to adding the error signal to the RAM output values.

* * * * *